United States Patent
Severinsson

(10) Patent No.: US 7,182,181 B2
(45) Date of Patent: Feb. 27, 2007

(54) DISC BRAKE HAVING A FIXED DISC

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/032,574

(22) Filed: Jan. 10, 2005

(65) Prior Publication Data

US 2005/0173207 A1    Aug. 11, 2005

Related U.S. Application Data

(63) Continuation of application No. PCT/SE03/01113, filed on Jun. 26, 2003.

(30) Foreign Application Priority Data

Jul. 8, 2002   (SE) .................................. 0202135

(51) Int. Cl.
   *F16D 55/08*   (2006.01)
(52) U.S. Cl. .................. 188/72.8; 188/71.9; 188/72.9
(58) Field of Classification Search ............... 188/71.1, 188/71.7, 71.8, 71.9, 72.1, 72.6, 72.7, 72.8, 188/72.9, 73.1, 73.46, 71.9 X, 72.9 X
See application file for complete search history.

(56) References Cited

U.S. PATENT DOCUMENTS

| 3,664,469 | A | 5/1972 | Maurice | ..................... 188/72.9 |
|---|---|---|---|---|
| 4,181,199 | A | 1/1980 | Flotow et al. | ............. 188/72.9 |
| 6,367,596 | B1 * | 4/2002 | Kraihanzel | .................. 188/171 |
| 2004/0026181 | A1 * | 2/2004 | Baumgartner et al. | ..... 188/71.7 |
| 2004/0035650 | A1 * | 2/2004 | Baumgartner et al. | ..... 188/72.9 |
| 2004/0045776 | A1 * | 3/2004 | Baumgartner et al. | ..... 188/71.7 |

FOREIGN PATENT DOCUMENTS

| DE | 41 25 881 A1 | 3/1992 |
|---|---|---|
| DE | 44 07 293 C1 | 10/1995 |
| EP | 0 431 382 A2 | 6/1991 |
| FR | 2646483 | 11/1990 |
| WO | WO 02/14125 A2 | 2/2002 |
| WO | WO 02/14125 A3 | 2/2002 |
| WO | WO 02/14707 * | 2/2002 |

* cited by examiner

*Primary Examiner*—Devon Kramer
(74) *Attorney, Agent, or Firm*—St. Onge Steward Johnston & Reens LLC

(57) ABSTRACT

The present invention concerns a disc brake having a fixed brake disc. On each of the opposing sides of the brake disc at least one brake pad is arranged. Furthermore, the disc brake has an actuator and a clamping device. The clamping device is axially fixed in relation to the brake disc, in order to facilitate that the brake pads are given a symmetrical movement in relation to the brake disc.

22 Claims, 2 Drawing Sheets

DISC BRAKE HAVING A FIXED DISC

This application is a continuation of pending International Patent Application No. PCT/SE2003/001113 filed on Jun. 26, 2003 which designates the United States and claims priority from Swedish Patent Application No. 0202135-0 filed on Jul. 8, 2002.

FIELD OF THE INVENTION

The present invention concerns a disc brake having a fixed disc.

PRIOR ART

One problem often occurring in disc brakes is that the brake pads are unevenly worn. They may be unevenly worn both in that sense that brake pads of the same brake are worn in different extent and in that sense that separate brake pads are worn asymmetrically, e.g. in a sloping way.

This problem may lead to a decreased function of the brakes. It may also be problematic at brake pad change, as it may be that only one brake pad needs to be changed. This normally leads to the use of one of two different strategies, which both are of economic disadvantage. Either all brake pads are changed at the same time, which means that still functional pads are discarded, or only the defect pad is changed, which means that the vehicle has to be taken in for brake pad changes more frequently.

One important aspect is that if the brake pads are worn evenly, and thus by the same amount on both sides of the disc it is possible to drive longer. This means that the vehicle will be driven longer before the pads are changed, which also means that there will be a lower cost per travelled distance. A further advantage is that due to symmetrical movement of the brake pads a single wear indicator may be used to indicate the true wear of the brake pads.

A further important aspect is that by the arrangement according to the present invention the axial space needed by the brake or clamping mechanism is reduced compared to disc brakes of the prior art. Furthermore, the space needed is reduced when the brake pads wear. The positions of the brake pads are automatically adjusted due to wear, as is well known in the art.

SUMMARY OF THE INVENTION

Thus, one object of the present invention is to guarantee that the brake pads are evenly worn and that all brake pads of one brake are worn out at the same time. It could also be expressed, as the movement of the brake pads should be symmetrical, both concerning brake application and compensation for wear. "Symmetrical movement" as used in this description means that the brake pads on both sides of the brake disc move the same distance toward or away from the brake disc.

A second object of the present invention is that the space, mainly in axial direction, occupied by the brake actuating means should be kept relatively small.

The above objects are achieved in a disc brake comprising a fixed brake disc, at least one brake pad on each of the opposing sides of the brake disc, an actuator and a clamping device. The clamping device is axially fixed in relation to the disc brake.

Furthermore, the disc brake has means to give symmetrical movement of the brake pads in relation to the brake disc. By means of the above one will have a predictable brake, where the brake pads are evenly worn, without the tendency for skewed wear and that the pads are worn out simultaneously.

According to the present invention all of the brake mechanism are placed on the same side of the brake disc, including units acting on brake pads on both sides of the brake disc. The units are acting in a pushing direction on the brake pad placed on the same side of the brake disc as the brake mechanism. The units acting on the brake pads on the opposite side of the brake disc are acting in a pulling direction. The pulling units are acting by means of a pull beam on the brake pads.

The brake may be used with actuators giving either a linear or a rotating movement. Furthermore, the actuators may be pneumatically, electro-mechanically or hydraulically activated. It is also possible to activate the actuator by means of accumulated or stored energy. Said energy may be accumulated hydraulically, pneumatically, electrically or mechanically, e.g. by means of a spring. The movement of the actuators is transferred to thrust means by means of a lever, which may have the form of a crankshaft, a transmission or the like. The transmission may have any suitable form and may be adapted to the type of actuator, thrust means, available space etc.

The present invention is directed to a disc brake having a fixed brake disc. Further objects and advantages of the present invention will be obvious for a person skilled in the art when reading the detailed description below of at present preferred embodiments.

BRIEF DESCRIPTION OF THE DRAWINGS

Different embodiments of the invention will be described in more detail below, with reference to the enclosed drawings and by way of examples. In the drawings

DETAILED DESCRIPTION OF PREFERRED EMBODIMENTS

Figure 1A:
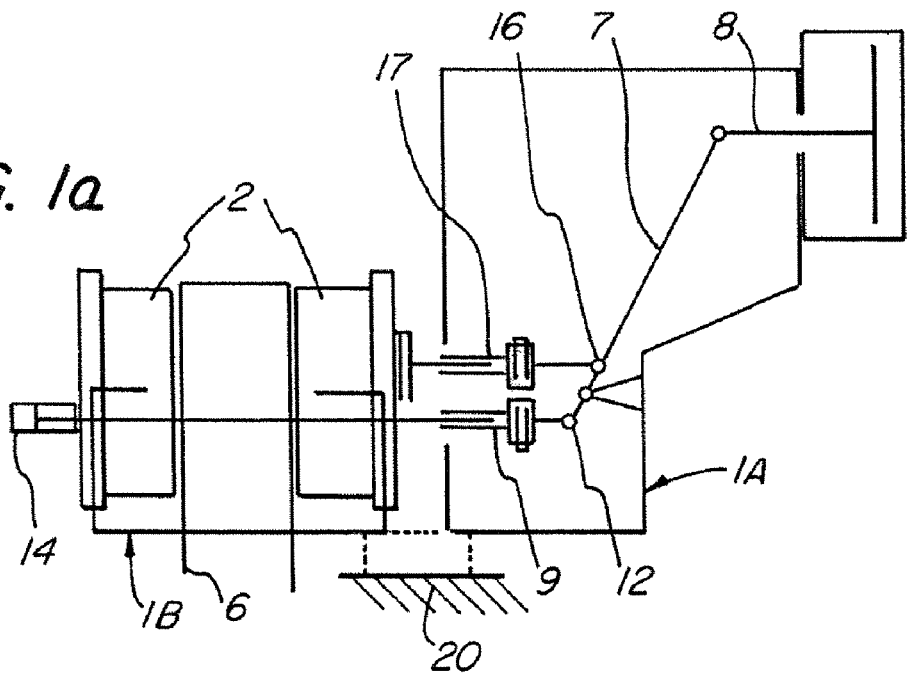
FIGS. 1a and 1b are a schematic side and plan view, respectively of a first embodiment of the present invention.
Figure 1B:
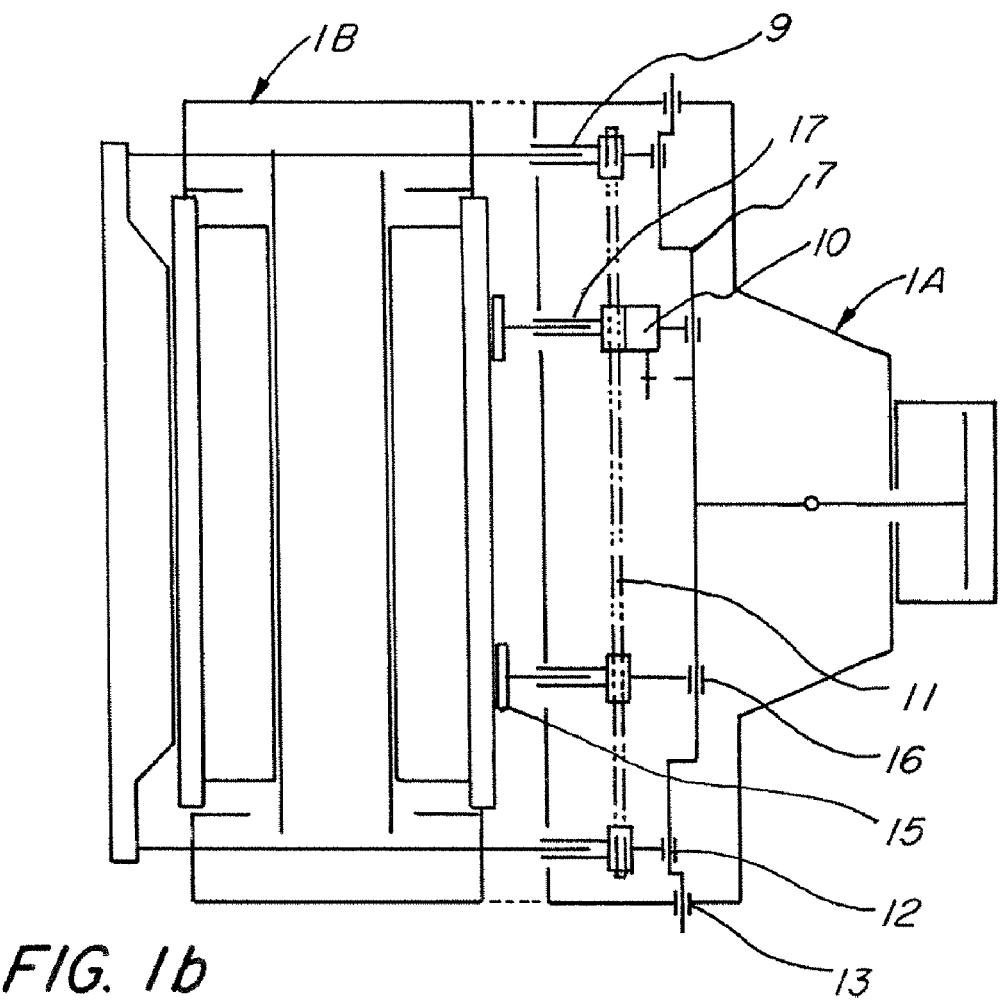

The disc brake according to the embodiment of FIG. 1 comprises a machine housing 1A and a brake pad support 1B. The machine housing 1A and pad support 1B may have many different designs and forms without deviating from the present invention. The disc brake has a brake disc 6 on which opposing brake pads 2 are acting in opposite directions. The brake has further parts not shown in the drawings. A person skilled in the art realises that the exact design of the different parts may vary. Only the parts of importance for the understanding of the invention are shown and described more extensively.

The machine housing 1A contains means for transferring the force and movement of a brake actuator 8 to the brake pads 2 of the disc brake. In this description, said means for transferring the force and movement of the brake actuator 8 is referred to as a "clamping device". The clamping device comprises force transmitting means, intermediate means acting between the actuator and said force transmitting means, and possible adjusting and/or synchronising means. The brake actuator according to the first embodiment is a linear unit, which is driven in any suitable way. The brake actuator 8 may, thus, be hydraulically, pneumatically or electrically actuated. As indicated above it is also possible to use accumulated energy to actuate the brake actuator 8.

The actuator 8 is attached to a lever 7. To the lever 7 also a number of screw units 9, 17 are attached. The screw units 9, 17 are of the type having an irreversible thread. The screw units 9, 17 are attached to the lever 7 by means of pivots 12, 16, thus the lever 7 is free to rotate in relation to the screw units 9, 17. In the shown embodiment there are four screw units 9, 17, of which two 9 are working in a pulling direction while the other two 17 are working in a pushing direction. In other embodiments other numbers of screw units are used. Thus, in some embodiments there is only one screw unit acting in respective direction. The screw units 9, 17 are also connected to a synchronisation device 11 synchronising the movements of the screw units 9, 17. The synchronisation device 11 synchronises the movements of the spindles during adjustment. The synchronisation device 11 may be of the type having a chain, belt, gear transmission or a common shaft, mainly parallel with the brake disc 6 and having bevelled or worm gears to respective screw unit. The pushing screw units 17 are acting directly on a thrust plate 15. The pulling screw units 9 are acting on a pull beam 14 placed on the opposite side of the brake disc 6 compared to the thrust plate 15. The pulling screw units 9 are attached to the pull beam 14 by means of rods, which are preferably attached to different outer ends of the pull beam 14.

The part of the lever 7 to which the screw units 9, 17 are attached has the form of a crankshaft. The lever 7, or more precisely, the crankshaft part of the lever 7 is received in a journalled way in bearings 13 of the machine housing 1A. The rotational axis of the crankshaft is aligned with the bearings 13 of the machine housing 1A. The pulling screw units 9 are attached to a part of the crankshaft placed below the rotational axis of the crank shaft, seen in the vertical direction according to FIG. 1. The pushing screw units 17 are attached to the crankshaft at a part placed above the rotational axis, seen in a vertical direction.

In normal way the brake pads 2 are received on a brake pad support 1B.

The mechanism housing 1A is axially fixed in relation to the brake disc 6. The mechanism housing 1A, formed of one or more separate parts, is fixed to some part of the support or suspension 20 of the wheel/brake disc 6. The mechanism housing 1A may also be an integrated part of the wheel support or suspension 20. A further variant is that the mechanism housing 1A is fixed to the pad support 1B (as indicated by dashed lines in FIG. 1b).

The main function of the pad support 1B is to transfer the braking torque produced at the brake pads 2 to the attachment means of the wheel/brake disc 6. The pad support 1B is axially fixed in relation to the brake disc 6. The pad support 1B, which may be formed of one or more separate parts, is fixed to a part of the support of the wheel/brake disc 6. The pad support 1B may also be an integrated part of the wheel support or suspension.

The mechanism housing 1A and the pad support 1B may be formed as an integrated unit, having one or more parts, with a common attachment or anyone of the methods described above.

In that the lever 7 is received in the mechanism housing 1A by means of the bearings 13, the movements of the thrust plate 15 and the pull beam 14 will be geometrically guided in relation to the mechanism housing 1A and thus the brake disc 6. For practical reasons it may be suitable to design the bearing 13 in such a way, that it has some elasticity towards the mechanism housing 1A.

An adjusting mechanism 10 may be placed on any of the screw units 9, 17 and may be mechanically activated by the movements of the lever 7 or may be electrically activated. The adjusting mechanism 10 may be any adjusting mechanism of known construction and will not be described further here.

The linear actuator 8 may comprise a park lock or a spring means to achieve a parking brake.

Figure 2A:
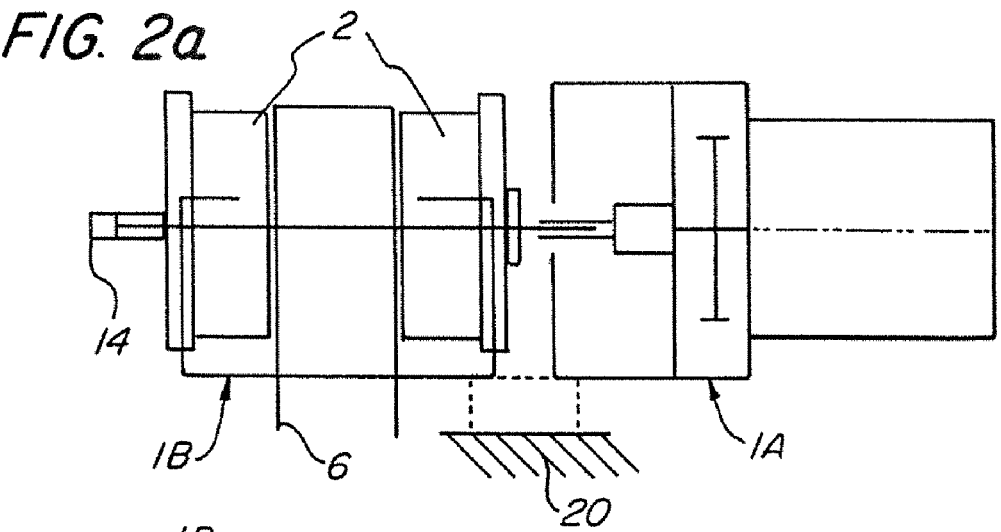
FIGS. 2a and 2b are a schematic side and plan view, respectively of a second embodiment of the present invention.
Figure 2B:
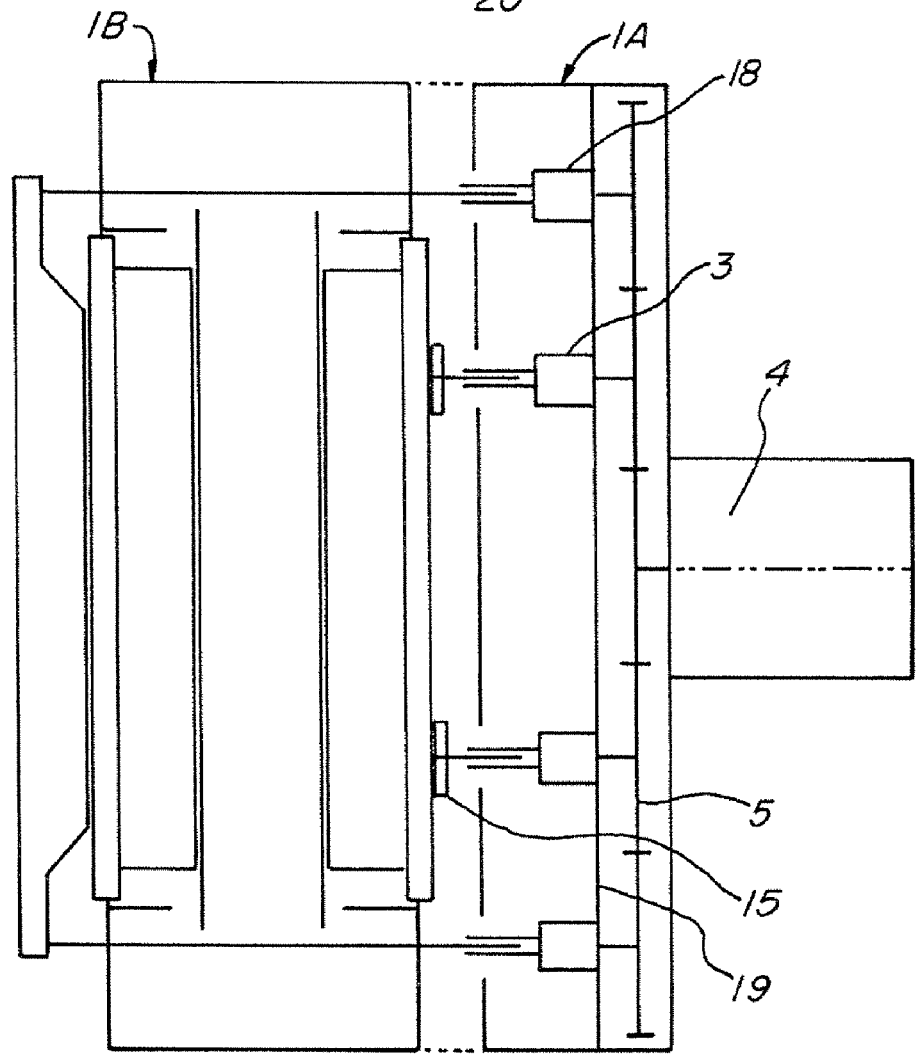

In the embodiment of FIG. 2 parts similar or identical with parts of the embodiment of FIG. 1 are given the same reference numbers. Such similar or identical parts will not be described extensively once again below.

One major difference between the shown embodiments is the brake actuator. In the embodiment of FIG. 1 the brake actuator is linear while it is working in a rotational manner in the embodiment of FIG. 2.

The brake actuator in the embodiment of FIG. 2 is a motor 4, which normally is an electrical motor, but any means giving a rotational movement and sufficient power may be used.

The motor 4 is connected to a transmission 5, which in the shown embodiment comprises five gear wheels. In other embodiments the transmission has the form of a chain or belt transmission. In a further embodiment the transmission has the form of a common shaft, mainly parallel with the brake disc 6 and having a bevelled or worm gear to respective screw unit 3, 18. The transmission 5 may be received in a separate part 19. The transmission part 19 may be integrated in the mechanism housing 1A or may be a separate part fixed to the mechanism housing 1A. It is often advantageous to fix the transmission part 19 with some elasticity to the mechanism housing 1A.

Screw units 3, 18 are connected to a gear wheel each of the transmission 5. The screw units 3, 18 may be of the type ball or roller screws or may be ramp units of a type having separate adjustment screws. One or more of the screw units 3 are acting on one or more brake pads 2 placed on the same side of the brake disc 6 as the brake mechanism. These screw units 3 are acting in a pushing direction on the brake pad(s) 2. The other two screw units 18 are acting on one or more brake pads 2 placed on the opposite side of the brake disc 6. These other two screw units are acting in a pulling direction. Due to the transmission 5 the screw units 3 acting in a pushing direction will be rotated in one direction and the other screw units 18 acting in a pulling direction will be rotated in the opposite direction. Thus, the screw units 3, 18 acting in pulling and pushing directions, respectively, may be identical. Expressed more generally it could be said that depending on the used type of transmission, the thread direction of the screw units is chosen to have a pulling force on one side of the brake disc and a pushing force on the other.

In the same way as for the first embodiment the mechanism housing 1A and the pad support 1B may be separate parts or integrated parts. They may also be fixed to the wheel/brake disc unit in many different ways. Furthermore, both the mechanism housing 1A and the pad support 1B are axially fixed in relation to the brake disc 6.

In this case the adjustment is done by means of the motor 4.

In that the screw units 3, 18 are fixed to the transmission part 19 the movement of the thrust plate 15 and the pull beam 14 will be geometrically guided in relation to the mechanism housing 1A and, thus, the disc brake 6. In some instances it may be beneficial to have an elastic fixation of the transmission part to the mechanism housing 1A.

The function of the brake will now be discussed briefly in view of both embodiments shown in the enclosed drawings. In use the actuator 4, 8 will act by means of the lever 7 or transmission 5 on screw units 3, 9, 17, 18. Said screw units will act in a pulling or pushing direction on brake pads 2 placed on opposite sides of a brake disc 6. The pushing screw units 3, 17 act on brake pad(s) 2 arranged on the same side of the brake disc 6 as the brake mechanism, while the pulling screw units act on brake pad(s) 2 arranged on the opposite side of the brake disc 6. All screw units 3, 9, 17, 18 are arranged on the same side of the brake disc 6 as the brake mechanism. The brake mechanism comprises the actuator 4; 8, the intermediate part 7; 5, and the screw units 9, 17; 3, 18. The pulling screw units 9, 18 are acting together by means of the pull beam 14 on the brake pads 2 on one side of the brake disc 6. By means of the synchronisation device 11 and the transmission 5, respectively, and the fixation of the lever 7 and transmission part 19, respectively, and as indicated above, the movements of the thrust plate 15 and pull beam 14 are geometrically guided in such a way that the movements of the brake pads 2 are symmetrical.

What is claimed is:

1. A disc brake comprising a fixed brake disc, at least one first brake pad disposed on a first side of the brake disc, at least one second brake pad disposed on a second side of the brake disc opposite the first side, an actuator, and a clamping device, which clamping device comprises first force transmitting means transmitting force to the at least one first brake pad, second force transmitting means transmitting force to the at least one second brake pad and intermediate parts acting between the actuator and the force transmitting means, wherein the clamping device is received fixed in a mechanism housing; wherein the disc brake further comprises a brake pad support; wherein the mechanism housing and brake pad support are axially fixed in relation to the brake disc and wherein at least part of each of the first force transmitting means, the second force transmitting means and the intermediate parts of the clamping device, and the actuator, are disposed on the first side of the brake disc, characterized in that the actuator acts by the intermediate parts on the force transmitting means and that the force transmitting means are screw units, which screw units are acting in a pulling or pushing direction on the at least one brake pad on each respective side of the brake disc, and characterized in that pushing screw units are acting on the brake pads placed on the same side of the brake disc as the brake mechanism, while pulling screw units act on the brake pads placed on the opposite side of the brake disc; and that the pulling screw units are connected to a pull beam.

2. The disc brake of claim 1, characterized in that the disc brake includes means to provide symmetrical movement of the brake pads in relation to the brake disc.

3. The disc brake of claim 1, characterized in that the mechanism housing and the brake pad support are integrated parts of a wheel suspension or wheel support.

4. The disc brake of claim 1, characterized in that the mechanism housing and the brake pad support are fixed to a wheel suspension or wheel support.

5. The disc brake of claim 1, characterized in that the mechanism housing is fixed to the brake pad support.

6. The disc brake of claim 1, characterized in that the mechanism housing and brake pad support are formed as a single integrated part.

7. The disc brake of claim 1, characterized in that the mechanism housing and the brake pad support have a common attachment means.

8. The disc brake of claim 1, characterized in that the actuator is activated electrically, hydraulically, pneumatically and/or by accumulated energy and/or comprises means to accomplish a park brake.

9. The disc brake of claim 8, characterized in that the screw units are ball or roller screws and/or of the type having a ramp.

10. The disc brake of claim 8, characterized in that the screw units have an irreversible thread.

11. The disc brake of claim 10, characterized in that an adjusting means is attached to at least one of the screw units.

12. The disc brake of claim 11, characterized in that the adjusting means is electrically activated.

13. The disc brake of claim 12, characterized in that the intermediate part acting on the screw units is a lever, partly having the form of a crankshaft.

14. The disc brake of claim 13, characterized in that the adjusting means is mechanically guided by means of the lever.

15. The disc brake of claim 13, characterized in that the lever is journalled in the mechanism housing by means of bearings; that the screw units are pivotally attached to the lever at opposing sides of the rotational axis of the lever seen in a vertical direction; and that the screw units are mechanically activated by the movements of the lever.

16. The disc brake of claim 14, characterized in that screw units, co-operating with brake pads on opposing sides of the brake disc, are attached to different parts of the crankshaft giving at least one screw unit a pulling direction and at least one screw unit a pushing direction independent of the direction of movement of the lever; and that the screw units are connected to a synchronisation device synchronising the movements of the screw units.

17. The disc brake of claim 12, characterized in that the actuator is acting in a rotational direction and that the intermediate part acting on the screw units is a transmission and that the transmission is a gear, chain or belt transmission or a common shaft, mainly parallel with the brake disc and having a bevelled or worm gear to respective screw unit.

18. The disc brake of claim 17, characterized in that the transmission will rotate the screw units acting on brake pads on opposing sides of the brake disc in opposing directions and that the transmission is arranged in a separate transmission part, to which the screw units are fixed.

19. The disc brake of claim 18, characterized in that the transmission part is an integrated part of the mechanism housing.

20. The disc brake of claim 19, characterized in that the transmission part is fixed to the mechanism housing.

21. The disc brake of claim 20, characterized in that the actuator is used as adjusting means for the screw units.

22. A disc brake comprising a fixed brake disc, at least one brake pad on each of opposing sides of the brake disc, an actuator, and a clamping device, which clamping device comprises force transmitting means and intermediate parts acting between the actuator and the force transmitting means, which force transmitting means are screw units, wherein the clamping device and the actuator are placed on one side of the brake disc, wherein pushing screw units are acting on the brake pads placed on the same side of the brake disc as the brake mechanism, while pulling screw units act on the brake pads placed on the opposite side of the brake disc, and wherein the pulling screw units are connected to a pull beam.

* * * * *